US012665883B2

(12) United States Patent
Sahani et al.

(10) Patent No.: US 12,665,883 B2
(45) Date of Patent: Jun. 23, 2026

(54) END USER PRIVACY MANAGEMENT OF ACCESSED DEVICE DATA

(71) Applicant: Omnissa, LLC, Mountain View, CA (US)

(72) Inventors: Hemant Sahani, Palo Alto, CA (US); Phillip Charles Krasko, Redwood City, CA (US); Scott Harlow Kelley, Atlanta, GA (US)

(73) Assignee: Omnissa, LLC, Mountain View, CA (US)

( * ) Notice: Subject to any disclaimer, the term of this patent is extended or adjusted under 35 U.S.C. 154(b) by 286 days.

(21) Appl. No.: 17/868,855

(22) Filed: Jul. 20, 2022

(65) Prior Publication Data

US 2024/0031340 A1     Jan. 25, 2024

(51) Int. Cl.
*H04L 9/40*                (2022.01)

(52) U.S. Cl.
CPC ........ *H04L 63/0421* (2013.01); *H04L 63/102* (2013.01); *H04L 63/105* (2013.01); *H04L 63/108* (2013.01)

(58) Field of Classification Search
CPC . H04L 63/0421; H04L 63/102; H04L 63/105; H04L 63/108
See application file for complete search history.

(56) References Cited

U.S. PATENT DOCUMENTS 6,345,361 B1     2/2002   Jerger et al.
10,521,419 B1 *  12/2019  Swamy .............. G06Q 10/0639

| | | | | |
|---|---|---|---|---|
| 2009/0083544 | A1 * | 3/2009 | Scholnick | ............. H04L 9/3231 |
| | | | | 713/186 |
| 2009/0181665 | A1 * | 7/2009 | Sater | ................... H04L 41/5064 |
| | | | | 455/424 |
| 2013/0205410 | A1 | 8/2013 | Sambamurthy et al. | |
| 2014/0026182 | A1 | 1/2014 | Pearl et al. | |
| 2017/0041296 | A1 | 2/2017 | Ford et al. | |
| 2021/0182423 | A1 * | 6/2021 | Padmanabhan | ....... H04L 9/3271 |

FOREIGN PATENT DOCUMENTS

TW          202129519  A  *  8/2021

OTHER PUBLICATIONS

International Search Report and Written Opinion in PCT/US23/11296 mailed Apr. 24, 2023.

* cited by examiner

*Primary Examiner* — Linglan Edwards
*Assistant Examiner* — Saron Matthewos Worku
(74) *Attorney, Agent, or Firm* — Kim & Stewart LLP

(57)          ABSTRACT

Disclosed are various examples for controlling and managing data access to increase user privacy and minimize intentional or inadvertent misuse of accessed information. Upon detecting a request for an administrator review of a user client device, permission for administrator access can be obtained from a user associated with the user client device. The client device identifier can be obfuscated such that the administrator accessing the data is not provided the actual device identifier. An administrator review session between the user client device and an administrator client device can be established to allow the administrator client device access to the permitted client device data.

20 Claims, 3 Drawing Sheets

END USER PRIVACY MANAGEMENT OF ACCESSED DEVICE DATA

BACKGROUND

With the emergence of bring-your-own-device (BYOD) technology in the workplace, enterprises permit employees or other personnel to use their own devices for business purposes. This can include accessing enterprise data, such as email and corporate documents. In addition, as enterprises offer workplace flexibility to employees by permitting hybrid or remote work environments, enterprises are challenged with improving the digital employee experience (DEX) to ensure a productive and seamless work experience for the distributed workforce.

Digital employee experience (DEX) tools can collect telemetry information to proactively uncover and remediate technical problems. The telemetry information can be related to device performance, device health, application performance, application usage, network performance network health, browser web application usage, browser web application performance, and/or other information. However, this information can indirectly be used to measure employee productivity or to gain confidential information. While DEX tools are critical for providing a better digital employee experience, the data collected has the potential for misuse by organizations challenged to measure productivity in the hybrid or remote work environments.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
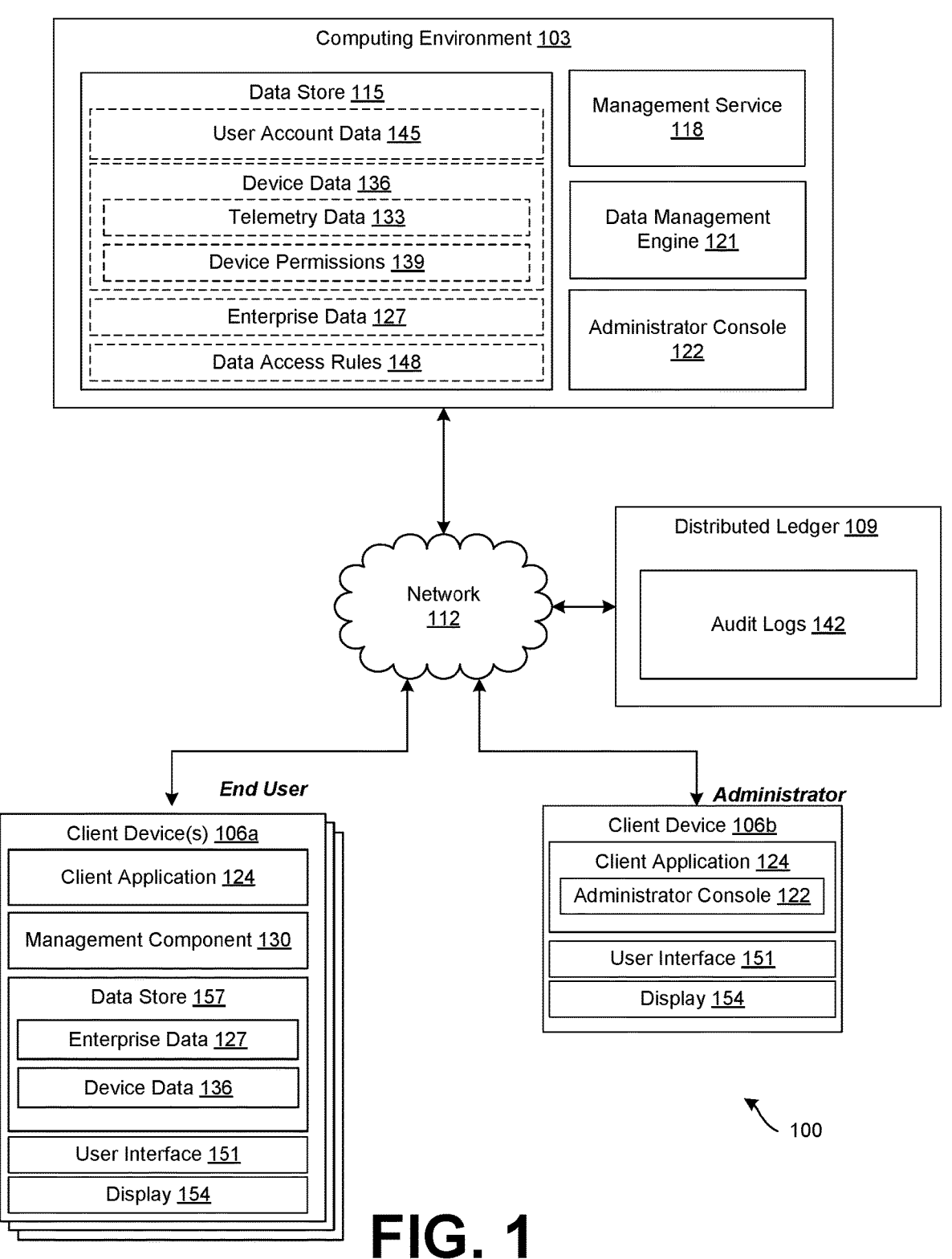
FIG. 1 is a drawing illustrating an example arrangement of a network environment according to various embodiments of the present disclosure.

The present disclosure relates to controlling and managing data access to increase user privacy and minimize intentional or inadvertent misuse of accessed information. When a user experiences an issue with computer technology (e.g., hardware, software, etc.), the user can reach out to an information technology (IT) administrator, a help desk administrator, or other permissible third-party to help remediate and resolve the issue. However, in order for the administrator to diagnose and resolve the issue, the administrator may be required to access telemetry information associated with the user device. The telemetry information can be related to device performance, device health, application performance, application usage, network performance network health, browser web application usage, browser web application performance, and/or other information. However, this information can be misused to track employee productivity or access confidential information. Therefore, it would be beneficial to protect rogue analysis and privacy issues resulting from administrator access.

According to various examples, the present disclosure provides safeguards for protecting and managing access to user data to minimize intentional or inadvertent misuse of information and protect the privacy of the user. The safeguards can include, for example, presenting obfuscated device identifiers or other type of identifying data to reviewing administrators, obtaining user permission prior to accessing data, allowing a user to define rules for permitting data access, storing audit logs of administrator access in a tamper-proof non-fungible ledger, and/or other safeguards. By implementing safeguards to control and manage the access of user data, rogue analysis of user data through administrator access is minimized.

In various implementations, user device data and corresponding user data can be protected by requiring explicit user approval and/or allowing a user to define access rules or time limitations associated with the access of data. Typically, telemetry collected from a user client device has a device identifier correlation. In order to protect the user device and user correlation, all data collected can be stored using an obfuscated device identifier. Accordingly, when an administrator accesses the data, the administrator is not privy to the actual device identifier thereby preventing the administrator from targeting the client device at a later time and conducting a rogue analysis of the client device using the actual device identifier.

In addition, prior to an information technology (IT) administrator or other permissible third-party accessing data associated with a user device, a user can be notified of potential data access and can provide permission allowing the administrator to access the data prior to the administrator being able to access to the data. In various examples, access limitations can be user-defined. For example, a user can define a time period associated with the access of data and/or can define what type of data can be accessed. In various examples, the user can define one or more of access rules in conjunction with providing permission. In some examples, one or more access rules can be defined by the user in the device settings of the device and/or through one or more digital employee experience tools provided by the enterprise. In various examples, machine learning techniques can be used to recommend rules or configurations for a user to apply for a given device or user context.

In various implementations, administrative actions on information that can identify a user device or associated user can be logged for auditing purposes. The audit log can include any information associated with the administrative review session including a time of session, a date of session, a length of the session, device permissions, a type of issue resolved, what type of data was accessed, how the issue was diagnosed, how the issue was resolved, administrative notes or rationale explaining why certain data was accessed, and/or other type of information. In various implementations, the audit log can be stored in a non-fungible distributed ledger. The audit log can further be used to remind an administrator of user transparency and the non-fungible auditing nature of the system. In various examples, an enterprise can further require an administrator's manager to approve an administrator's access to the client device or user information.

In various examples, the administrator review can be manual or automated. In some examples, the administrator can correspond to an individual manually reviewing the end user client device for root cause analysis and issue remediation. In other examples, the administrator can correspond to a machine (e.g., computing device) applying artificial intelligence for root cause analysis and issue remediation.

As with manual review, a machine accessing user data can be problematic as the machine could potentially try to target the client device and conduct a rogue analysis of the client device. Accordingly, the safeguards of the present disclosure to control and manage the access of user data, can be used for both automated and manual review of user data for root cause analysis and issue remediation.

With reference to FIG. 1, shown is an example of a networked environment 100. The networked environment 100 can include a computing environment 103, client devices 106a . . . 106b (collectively "client devices 106"), and a distributed ledger 109 in communication with one another over a network 112. The network 112 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement. The computing devices can be located in a single installation or can be distributed among many different geographical locations. The computing environments 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed. As the computing environment 103 communicates with the client devices 106 remotely over the network 112, the computing environment 103 can be described as a "remote" or "cloud" computing environment 103.

The computing environment 103 can include a data store 115. The data store 115 can include memory of the computing environment 103, mass storage resources of the computing environment 103, or any other storage resources on which data can be stored by the computing environment 103. The data stored in the data store 115, for example, can be associated with the operation of the various applications or functional entities described below.

The components executed on the computing environment 103 can include, for example, a management service 118, a data management engine 121, an administrator console 122, as well as other applications, services, processes, systems, engines, or functionality not discussed in detail herein. The management service 118 can be executed to oversee the operation of client devices 106 enrolled (or to be enrolled) with the management service 118. In some implementations, an enterprise, such as one or more companies or other organizations, can operate the management service 118 to oversee or manage the operation of the client devices 106 of its employees, contractors, customers, or other users having user accounts with the management service 118.

The management service 118 can cause various software components to be installed on a client device 106. Such software components can include, for example, client applications 124, resources, libraries, drivers, device configurations and profiles, or other similar components that require installation on the client device 106 as specified by an administrator of the management service 118. The management service 118 can further cause policies to be implemented on a client device 106. Policies can include, for example, restrictions or permissions pertaining to capabilities of a client device 106 such that access to enterprise data 127 is secured on the client device 106.

The management service 118 can interact with one or more client applications 124 executed on the client device 106 to perform management functions. In one example, the management service 118 interacts with management component 130 on a client device 106 associated with an end user to enroll the client device 106 with the management service 118. When enrolled, the management component 130 can be registered as a device administrator of the client device 106, which can provide the management component 130 with sufficient privileges to control the operation of the client device 106. In one example, the management component 130 can be registered as the device administrator through the installation of a management profile at the operating system of the client device 106 that causes the operating system to designate the management component 130 as the device administrator.

The management service 118 can direct the management component 130 to perform device management functions on the client device 106. For example, the management service 118 can direct the management component 130 to control access to certain software or hardware functions available on the client device 106. As a result, the management service 118 can verify that the configuration and operation of the client device 106 is in conformance with predefined criteria that ensures that enterprise data 127, or other data, is protected from data loss, unauthorized access, or other harmful events.

The management service 118 can further provision enterprise data 127 to the client device 106 through the management component 130. In one example, the management service 118 can cause the management component 130 to control use of the client device 106 or provision enterprise data to the client device 106 through use of a command queue provided by the management service 118. In some examples, the management service 118 can store commands in a command queue associated with a particular client device 106 and accessible by the particular client device 106. In some examples, the management service 118 can transmit an instruction to an original equipment manufacturer (OEM) messaging service specific to the client devices 106 (e.g., ANDROID CLOUD MESSAGING SERVICE™ for ANDROID client devices) to cause the OEM specific messaging service to send an instruction to the operating systems of the client devices 106, which causes the client devices 106 to retrieve commands from the command queues provided by the management service 118. In other examples, the management component 130 is executed by such client device 106 to retrieve the contents of the command queue. In one example, the management component 130 can retrieve the contents of the command queue on a configured interval, such as every four hours, or upon detection of a certain event, such as detection of an unauthorized application being executed by the client device 106. The management service 118 can also push commands to the management component 130. In any case, management component 130 can receive the contents of the command queue from the management service 118.

The data management engine 121 can interact with client applications 124 and/or the management component 130 on an end user client device 106a to collect telemetry data 133 associated with the client device 106 and store the telemetry data in the data store 115. The telemetry data 133 can comprise data related to device performance, device health, application performance, application usage, network performance network health, browser web application usage, browser web application performance, and/or other data associated with the client device 106. In various examples, the data management engine 121 can store the telemetry data 133 with an obfuscated device identifier to prevent administrators or devices with access to the telemetry data 133 from identifying the actual client device 106.

In various implementations, the data management engine 121 can initiate an administrative review session between the end user client device 106a and an administrator client device 106b when administrator review is needed to diagnose and/or remediate computer technology issues occurring on the end user client device 106a. In various examples, the data management engine 121 can initiate the administrative review session in response to detecting a request for administrator review. In some examples, a request is obtained from a client application 124 on the user client device. For example, a user may interact with a client application 124 to request administrator review of an issue occurring on the client device 106. In some examples, the request can be the result of an automated trigger associated with client application 124 being executed on the end user client device 106a. For example, a client application 124 can detect an occurrence of an issue and automatically generate a request for administrator review. In other examples, the request can comprise an administrator request obtained from the administrator client device 106b. In initiating the administrative review session between the end user client device 106a and the administrator client device 106b, the data management engine 121 can obfuscate the device identifier of the end user client device 106a and/or another identifier that can be used to identify the client device 106. As such, the administrator of the administrator client device 106b is unable to access data associated with the end user client device 106a at a later time using the device identifier. In various examples, the administrator review is manually performed by an individual. In other examples, the administrator review is automated and performed according to artificial intelligence techniques.

In various implementations, the data management engine 121 can generate a notification to send to the end user client device 106a identifying the type of data access required by the administrator and requesting permission of the user associated with the end user client device 106a. In various examples, the data management engine 121 can send the notification through simple messaging service (SMS), email, instant messaging, in-app messaging, or other communication medium. In various examples, the notification can include one or more user interface components that, upon user interaction, allow a user to permit access to the client device data 136 and/or define device permissions 139 for the access. The device permissions 139 can include time restrictions (e.g., one hour, one day, length of the session, etc.) for permitting access to the data, data type restrictions defining what type of data can be access or permitted, and/or other type of permissions. In some examples, the device permissions 139 are defined in response to receiving a notification of data access. In other examples, a user can define the device permissions 139 through interactions with a client application 124.

In various examples, the data management engine 121 can generate an audit log 142 that includes administrator actions associated with the administrative review session. In various examples, the audit log 142 can include any information associated with the administrative review session including a time, a date, a length of the administrative review session, device permissions 139, a type of issue resolved, what type of data was accessed, how the issue was diagnosed, how the issue was resolved, administrative notes or rationale explaining why certain data was accessed, and/or other type of information. In various implementations, the audit log 142 can be stored in a non-fungible distributed ledger 109. The distributed ledger 109 represents a synchronized, eventually consistent, data store spread across multiple nodes in different geographic or network locations. Each member of the distributed ledger 109 can contain a replicated copy of the distributed ledger 109, including all data stored in the distributed ledger 109. Records of data (e.g., audit logs 142) involving the distributed ledger 109 can be shared or replicated using a peer-to-peer network connecting the individual members that form the distributed ledger 109. Once a transaction or record is recorded in the distributed ledger 109, it can be replicated across the peer-to-peer network until the record is eventually recorded with all members. Various consensus methods can be used to ensure that data is written reliably to the distributed ledger 109. Examples of a distributed ledger can include blockchains, distributed hash tables (DHTs), and similar data structures. In various examples, the data management engine 121 can provide a copy of the audit log 142 to the end user client device 106a via a client application 124 to provide complete transparency of the administrator's action during the administrator review session.

The administrator console 122 can provide an administrative interface for an administrator reviewing an end user client device 106a that is administered by the management service 118 or otherwise having client applications 124 associated with the management service 118. Accordingly, the administrator console 122 can correspond to a web page or web application provided by a web server hosted in the computing environment 103. For example, the administrator console 122 can provide an interface for an administrative user to access device data 136 including telemetry data 133 of an end user client device 106a, review the device data 136 to diagnose, and interface with the client device 106 to remediate any type of issues that may be occurring on the device 106, as well as various other actions related to the operation of various implementations.

The data stored in the data store 115 can include, for example, user account data 145, device data 136, enterprise data 127, data access rules 148, as well as other data. The user account data 145 can include information pertaining to end users of the client devices 106 enrolled with the management service 118. For instance, the user account data 145 can include data used to authenticate an end user, such as a username, password, email address, biometric data, device identifier, registry identifier, or other data. Additionally, the user account data 145 can include other information associated with an end user, such as name, organization unit, or other information.

The device data 136 can include information about the end user client device 106a. The device data 136 can include, for example, information specifying applications that are installed on the client device 106, configurations or settings that are applied to the client device 106, user accounts associated with the client device 106, the physical location of the client device 106, the enterprise associated with the client device 106, the network to which the client device is connected, and/or other information associated with the client device 106.

The device data 136 can also include telemetry data 133 and device permissions 139. The telemetry data 133 can include information collected from client application 124 and/or the management component 130 on the client device 106. The telemetry data 133 can comprise data related to device performance, device health, application performance, application usage, network performance network health, browser web application usage, browser web application performance, and/or other data associated with the client device 106. The device permissions 139 can include time restrictions (e.g., one hour, one day, length of the session, etc.) for permitting access to the data, data type restrictions defining what type of data can be access or permitted, and/or other type of permissions. In some examples, the device permissions 139 are user-defined in response to receiving a notification of data access. In other examples, a user can define the device permissions 139 through interactions with one or more client applications 124. In some examples, one or more of the device permissions 139 are predefined and can be modified by a user in response to one or more client applications 124. In some examples, the one or more device permissions 139 can be recommended to a user based at least in part on device data and/or user account data.

Enterprise data 127 can include email, corporate documents, social media, messages, enterprise applications, confidential documents, and other enterprise content or communications. The data access rules 148 can include rules, models, and/or configuration data for the various algorithms or approaches employed by the data management engine 121 in controlling and managing data access of an end user client device 106a by an administrator client device 106b. For example, the data access rules 148 can include rules or machine-learning models associated with identifying a type of issue the user is experiencing and selecting the type of data that can be accessed for review. In some examples, the data access rules 148 can include machine-learning models used to recommend device permissions 139 for a given client device 106.

The client device 106 can be representative of one or more client devices 106. The client device 106 can include a processor-based system, such as a computer system, which can include a desktop computer, a laptop computer, a personal digital assistant, a cellular telephone, a smartphone, a set-top box, a music player, a tablet computer system, a game console, an electronic book reader, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include an operating system configured to execute various client applications 124, such as the management component 130 or other application. Some client applications 124 can access network content served up by the computing environment 103 or other servers, thereby rendering a user interface 151 on a display 154, such as a liquid crystal display (LCD), touch-screen display, or other type of display device. To this end, some client applications 124 can include a web browser or a dedicated application, and a user interface 151 can include a network page, an application screen, or other interface. Further, other client applications 124 can include device management applications, enterprise applications, social networking applications, word processors, spreadsheet applications, media viewing applications, or other applications.

The client device 106 can also include a data store 157. The data store 157 can include memory of the client devices 106 or any other storage resources on which data can be stored by the client device 106. The data store 157 can include enterprise data 127 and/or other data. The data store 157 can include other data associated with the client application 124, the operating system, and the management component 130.

Figure 2:
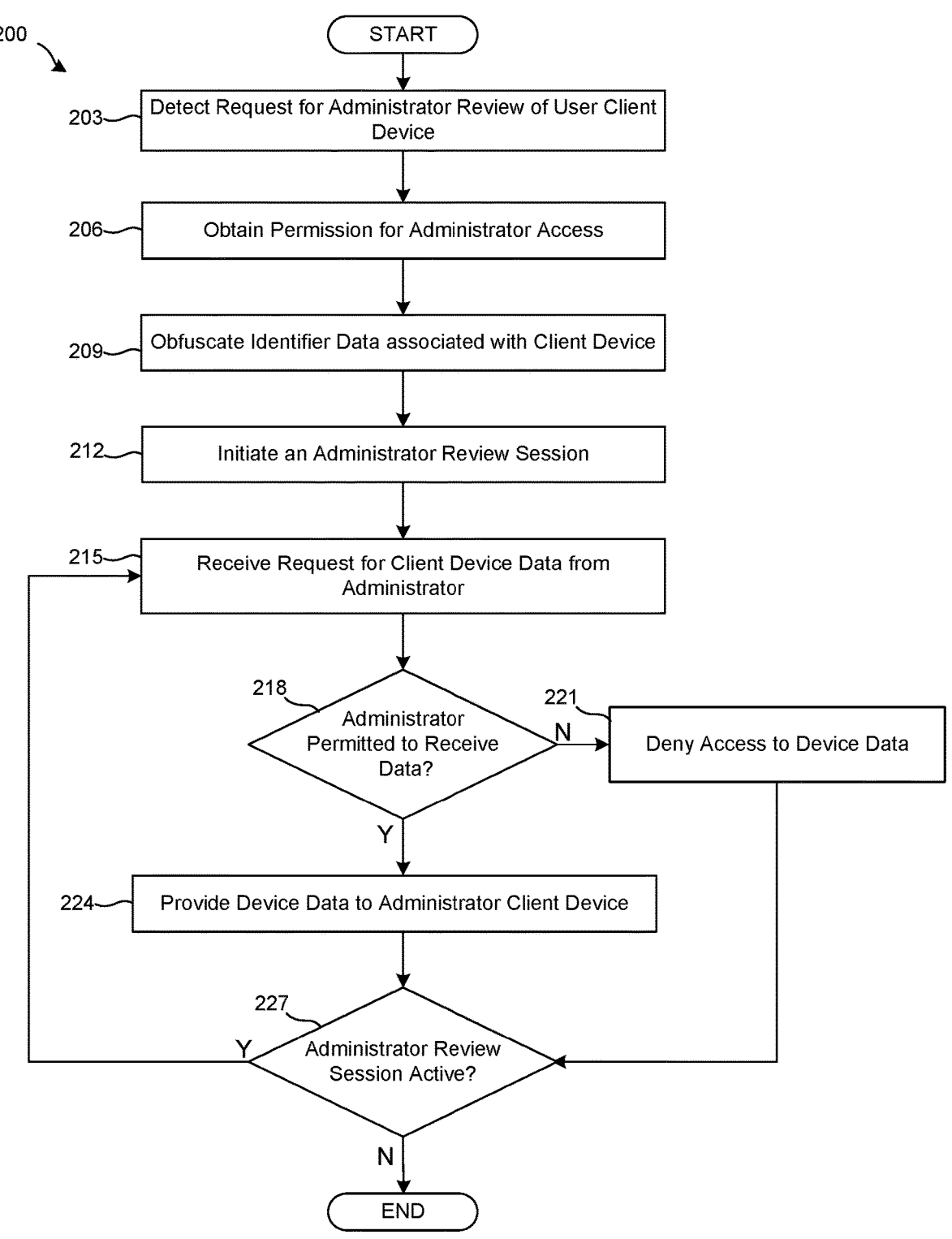
FIGS. 2-4 are example flowcharts illustrating functionality implemented by components of the networked environment.
Figures 3, 4:
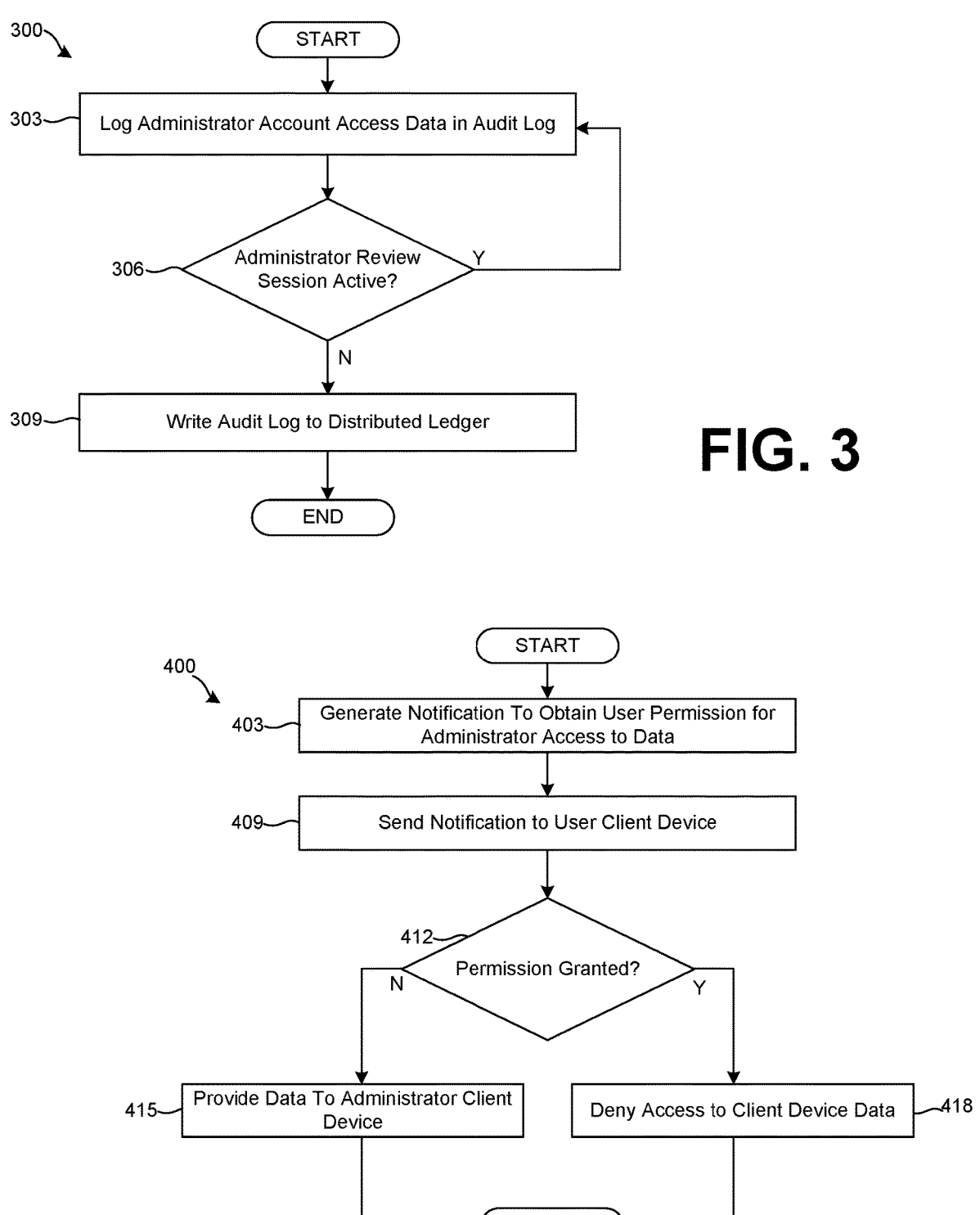

Next, a general description of the operation of the components of the networked environment 100 is provided with reference to FIGS. 2-4. FIG. 2 illustrates a flowchart 200 that provides one example of the operation of a portion of the computing environment 103. The flowchart of FIG. 2 can be viewed as depicting an example of elements of a method implemented by the data management engine 121, management service 118, or other suitable software component according to one or more examples. The separation or segmentation of functionality as discussed herein is presented for illustrative purposes only.

In step 203, the data management engine 121 detects a request for administrator review of an end user client device 106a. In some examples, a request is received from a client application 124 on the end user client device 106a. For example, a user may interact with a client application 124 to request administrator review of an issue occurring on the client device 106. In some examples, the request can be the result of an automated trigger associated with client application 124 being executed on the end user client device 106a. For example, a client application 124 can detect an occurrence of an issue and automatically generate a request for administrator review. In other examples, the request can comprise an administrator request obtained from the administrator client device 106b. For example, an administrator can send an administrator request to review a particular review in response to a detection of a potential issue associated with the client device 106 upon a review of collective data associated with multiple client devices 106.

In step 206, the data management engine 121 obtains permission from the user of the client device 106 for administrator access to device data 136. In various implementations, the data management engine 121 can generate a notification to send to the end user client device 106a identifying the type of data access required by the administrator and requesting permission of the user associated with the end user client device 106a. In various examples, the data management engine 121 can send the notification through simple messaging service (SMS), email, instant messaging, in-app messaging, or other communication medium. In various examples, the notification can include one or more user interface components that, upon user interaction, allow a user to permit access to the client device data 136 and/or define device permissions 139 for the access. In some examples, the data management engine 121 can obtain permission in response to a review of user-defined device permissions 139 to determine if a user has defined rules associated with permitting data access for administrator review. For example, the user can configure the device permissions 139 to indicate that the user would like to be notified prior to access of data, indicate that the user would like to explicitly provide permission to any type of data access, define what type of data access is permitted without notification to the user, define a time period associated with the data access, and/or other types of rules or configurations.

In step 209, the data management engine 121 obfuscates the device identifier associated with the end user client device 106a. In various examples, the data management engine 121 obfuscates the device identifier using encryption, renaming, or other type of obfuscating technique. Accordingly, when an administrator accesses the data, the administrator can be provided the obfuscated device identifier instead of the actual device identifier associated with the client device 106. Accordingly, the administrator of the administrator client device 106b is prevented from targeting the client device 106 at a later time and conducting a rogue analysis of the client device using the actual device identifier.

In step 212, the data management engine 121 initiates an administrator review session between the end user client device 106a and the administrator client device 106b. In some examples, the data management engine 121 can cause the administrator console 122 to provide an administrative interface on the administrator client device 106b while linking access to the client device 106a. In some examples, the data management engine 121 can initiate a remote access session via the administrator console 122 to allow the administrator with access into the end user client device 106a. Accordingly, the data management engine 121 manages the administrator review session by initiating and managing the channel in which the administrator client device 106b can access device data 136 associated with a given end user client device 106a.

In step 215, the data management engine 121 receives a request for client device data 136 from the administrator client device 106b. For example, an administrator can interact with the administrator console 122 to request client device data 136. The administrator console 122 can interact with the data management engine 121 to obtain the requested device data 136. In other examples, the data management engine 121 can intercept a request to the client device 106 for the client device data 136.

In step 218, the data management engine 121 determines whether the administrator is permitted to receive the client device data 136. In various examples, the data management engine 121 determines whether the device permissions 139 restrict the administrator or administrator client device 106b from accessing the requested device data 136. In some implementations, the data management engine 121 identifies the type of issue associated with the administrator review session and determines the type of client device data 136 that is permitted to access based at least in part on the type of issue. In some examples, the type of issue can be identified based at least in part on the request detected. For example, the request can identify the issue and/or an application associated with the issue. In other examples, the type of issue can be identified based at least in part on the type of device, user account data 145, and/or other factors. In some examples, the data access rules 148 can include a machine-learning model that can be trained to identify the type of issue based at least in part on the device data 136, the user account data 145, and/or the request and determine the type of data that can be accessed for the type of issue. In some implementations, the data management engine 121 can determine whether the permitted time period for data access has lapsed. If the permitted time period for data access has lapsed, the administrator is determined to not be permitted to receive the requested device data 136. If the administrator is permitted to receive the requested client device data 136, the data management engine 121 proceeds to step 224. Otherwise, the data management engine 121 proceeds to step 221 where the data management engine 121 denies the administrator client device 106b access to the requested client device data 136.

In step 224, the data management engine 121 provides the requested device data 136 to the administrator client device 106b. In some examples, the data management engine 121 obtains the requested device data 136 from the data store 115. In other examples, the data management engine 121 obtains the requested device data 136 in response to a request to a client application 124 executing on the end user client device 106a. In various examples, the data management engine 121 can provide the requested device data 136 to the administrator console which is configured to render the requested device data 136 for display on the administrator client device 106b.

In step 227, the data management engine 121 determines whether the administrator review session is active. For example, if the permitted time period is determined to have lapsed, the data management engine 121 can cancel the administrator review session by disconnecting the communication channel between the administrator client device 106b and the end user client device 106a. In other examples, either the administrator client device 106b or the end user client device 106a can end the administrator review session thereby disconnecting the established channel between the client devices 106. If the administrator review session is still active, the data management engine 121 returns to step 215. Otherwise, the process can proceed to completion.

Referring next to FIG. 3, shown is a flowchart 300 that provides one example of the operation of a portion of the computing environment 103. The flowchart of FIG. 3 can be viewed as depicting an example of elements of a method implemented by the data management engine 121, management service 118, or other suitable software component according to one or more examples. The separation or segmentation of functionality as discussed herein is presented for illustrative purposes only.

In step 303, the data management engine 121 logs administrator account access data into a generated audit log 142. In various implementations, the data management engine 121 can generate an audit log 142 that includes administrator actions associated with the administrator review session. In various examples, the audit log 142 can include any information associated with the administrative review session including a time, a date, a length of the administrative review session, device permissions 139, a type of issue resolved, what type of data was accessed, how the issue was diagnosed, how the issue was resolved, administrative notes or rationale explaining why certain data was accessed, and/or other type of information. As the administrator performs actions during the administrator review session, the data management engine 121 can monitor the actions of the administrator and log the actions in the audit log 142.

In step 306, the data management engine 121 determines whether the administrator review session is active. For example, if the permitted time period is determined to have lapsed, the data management engine 121 can cancel the administrator review session by disconnecting the communication channel between the administrator client device 106b and the end user client device 106a. In other examples, either the administrator client device 106b or the end user client device 106a can end the administrator review session thereby disconnecting the established channel between the client devices 106. If the administrator review session is still active, the data management engine 121 returns to step 303. Otherwise, the data management engine 121 proceeds to step 309.

In step 309, the data management engine 121 stores the audit log 142 in the distributed ledger 109. Once the audit log 142 is recorded by a given computing node in the distributed ledger 109, it can be replicated across the peer-to-peer network until the audit log 142 is eventually recorded with all members. Various consensus methods can be used to ensure that data is written reliably to the distributed ledger 109. In various examples, the computing environment 103 comprises a node of a plurality of nodes of the distributed ledger 109. Thereafter, the process can proceed to completion.

Moving on to FIG. 4, shown is a flowchart 400 that provides one example of the operation of a portion of the computing environment 103. The flowchart of FIG. 4 can be viewed as depicting an example of elements of a method implemented by the data management engine 121, management service 118, or other suitable software component according to one or more examples. The separation or segmentation of functionality as discussed herein is presented for illustrative purposes only.

In step 403, the data management engine 121 generates a notification to obtain user permission for administrator access to client device data 136. In various examples, the notification can include one or more user interface components that, upon user interaction, allow a user to permit access to the client device data 136 and/or define device permissions 139 for the access. For example, the notification can comprise a selectable component, that upon selection, indicates approval by the user for administrator access to client device data 136.

In step 406, the data management engine 121 sends the notification to the end user client device 106a. In various examples, the data management engine 121 can send the notification through simple messaging service (SMS), email, instant messaging, in-app messaging, or other communication medium.

In step 409, the data management engine 121 determines whether permission is granted. For example, the user interacting with the notification can deny or permit access to the user based on user interactions with user interface components included in the notification. If the user has permitted the access, the data management engine 121 proceeds to step 415. Otherwise, the data management engine 121 proceeds to step 418.

At step 415, the data management engine 121 provides the requested device data 136 to the administrator client device 106b. In some examples, the data management engine 121 obtains the requested device data 136 from the data store 115. In other examples, the data management engine 121 obtains the requested device data 136 in response to a request to a client application 124 executing on the end user client device 106a. In various examples, the data management engine 121 can provide the requested device data 136 to the administrator console which is configured to render the requested device data 136 for display on the administrator client device 106b.

At step 418, the data management engine 121 denies the administrator client device 106b to the requested device data 136. In various examples, the data management engine 121 can generate notification which can be rendered on a display 154 of the administrator client device 106b via the administrator console 122. The notification can be generated to indicate the denial of access to the requested device data 136. Thereafter, the process can proceed to completion.

Functionality attributed to the executable components discussed herein can be implemented in a single process or application or in multiple processes or applications. The separation or segmentation of functionality as discussed herein is presented for illustrative purposes only.

Flowcharts and sequence diagrams can show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagrams can show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The computing devices and other hardware components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the various executable software components can be stored in one or more storage devices and be executable by one or more processors. Also, a data store can be stored in the one or more storage devices.

The functionalities described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in at least one computing device or by using multiple computing devices.

As used herein, "about," "approximately," and the like, when used in connection with a numerical variable, can generally refers to the value of the variable and to all values of the variable that are within the experimental error (e.g., within the 95% confidence interval for the mean) or within +/−10% of the indicated value, whichever is greater.

Where a range of values is provided, it is understood that each intervening value and intervening range of values, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

The invention claimed is:

1. A system, comprising:
at least one computing device; and
at least one application executable in the at least one computing device, wherein the at least one application, when executed, causes the at least one computing device to:
detect a request for an administrator review of a user client device;
obtain permission for administrator access to client device data from a user associated with the user client device;
generate an obfuscated client device identifier from an actual client device identifier associated with the user client device;
initiate an administrator review session between the user client device and an administrator client device, the administrator client device identifying the user client device via the obfuscated client device identifier, the actual client device identifier being neither provided to nor obtainable by the administrator client device;
identify a type of computer technology issue occurring on the user client device and associated with the administrator review session based on a type of the user client device and user account data of the user, the computer technology issue being of performance of at least one of the user client device, an application in the user client device, and a network connected to the user client device;
determine a type of client device data that is permitted to access based on the identified type of computer technology issue; and
during the administrator review session, correlate client device data of the determined type with the obfuscated client device identifier, instead of the actual client device identifier, and provide the client device data of the determined type and the obfuscated client device identifier correlated therewith to the administrator client device.

2. The system of claim 1, wherein the request is detected in response to at least one of a user request obtained from the user client device, an automated trigger associated with a client application being executed on the user client device, or an administrator request obtained from the administrator client device.

3. The system of claim 1, wherein, when executed, the at least one application further causes the at least one computing device to at least generate a notification requesting permission for an administrator to access the client device data, the permission being obtained in response to a user interaction with the notification.

4. The system of claim 1, wherein, when executed, the at least one application further causes the at least one computing device to at least:
generate an audit log associated with the administrator review session, the audit log identifying activity by an administrator during access session and including how the computer technology issue was diagnosed and how the computer technology issue was resolved; and
write the audit log to a distributed ledger.

5. The system of claim 1, wherein, when executed, the at least one application further causes the at least one computing device to at least terminate the administrator review session in an instance in which a user-defined time period for the administrator access has expired.

6. The system of claim 1, wherein, when executed, the at least one application further causes the at least one computing device to at least obtain user-defined permissions associated with an access of the client device data, wherein the client device data is provided to the administrator client device based at least in part on the user-defined permission.

7. The system of claim 1, wherein
the type of computer technology issue is identified using a machine-learning model, and
when executed, the at least one application further causes the at least one computing device to at least train, based on the client device data of the determined type, the machine-learning model.

8. A computer-implemented method, comprising:
detecting, by at least one computing device, a request for an administrator review of a user client device;
obtaining, by the at least one computing device, permission for administrator access to client device data from a user associated with the user client device;
generating, by the at least one computing device, an obfuscated client device identifier from an actual client device identifier associated with the user client device;
initiating, by the at least one computing device, an administrator review session between the user client device and an administrator client device, the administrator client device identifying the user client device via the obfuscated client device identifier, the actual client device identifier being neither provided to nor obtainable by the administrator client device;
identifying a type of computer technology issue occurring on the user client device and associated with the administrator review session based on a type of the user client device and user account data of the user, the computer technology issue being of performance of at least one of the user client device, an application in the user client device, and a network connected to the user client device;

determining a type of client device data that is permitted to access based on the identified type of computer technology issue; and by the at least one computing client device, during the administrator review session, correlating the client device data of the determined type with the obfuscated client device identifier, instead of the actual client device identifier, and providing the client device data of the determined type and the obfuscated client device identifier correlated therewith to the administrator client device.

9. The computer-implemented method of claim 8, wherein the request is detected in response to at least one of a user request obtained from the user client device, an automated trigger associated with a client application being executed on the user client device, or an administrator request obtained from the administrator client device.

10. The computer-implemented method of claim 8, further comprising generating a notification requesting permission for an administrator to access the client device data, the permission being obtained in response to a user interaction with the notification.

11. The computer-implemented method of claim 8, further comprising:

generating an audit log associated with the administrator review session, the audit log identifying activity by an administrator during access session and including how the computer technology issue was diagnosed and how the computer technology issue was resolved; and writing the audit log to a distributed ledger.

12. The computer-implemented method of claim 8, further comprising terminating the administrator review session in an instance in which a user-defined time period for the administrator access has expired.

13. The computer-implemented method of claim 8, further comprising obtaining user-defined permissions associated with an access of the client device data, wherein the client device data is provided to the administrator client device based at least in part on the user-defined permission.

14. The computer-implemented method of claim 8, wherein the type of computer technology issue is identified using a machine-learning model, and the method further comprises training, based on the client device data of the determined type, a machine-learning model to identify the type of issue.

15. A non-transitory computer-readable medium embodying executable instructions, which, when executed by a processor, cause at least one computing device to at least:

detect a request for an administrator review of a user client device;

obtain permission for administrator access to client device data from a user associated with the user client device;

generate an obfuscated client device identifier from an actual client device identifier associated with the user client device;

initiate an administrator review session between the user client device and an administrator client device, the administrator client device identifying the user client device via the obfuscated client device identifier, the actual client device identifier being neither provided to nor obtainable by the administrator client device;

identify a type of computer technology issue occurring on the user client device and associated with the administrator review session based on a type of the user client device and user account data of the user, the computer technology issue being of performance of at least one of the user client device, an application in the user client device, and a network connected to the user client device;

determine a type of client device data that is permitted to access based on the identified type of computer technology issue; and during the administrator review session, correlate the client device data of the determined type with the obfuscated client device identifier, instead of the actual client device identifier, and provide the client device data of the determined type and the obfuscated client device identifier correlated therewith to the administrator client device.

16. The non-transitory computer-readable medium of claim 15, wherein the request is detected in response to at least one of a user request obtained from the user client device, an automated trigger associated with a client application being executed on the user client device, or an administrator request obtained from the administrator client device.

17. The non-transitory computer-readable medium of claim 15, wherein, when executed, the executable instructions further cause the at least one computing device to at least generate a notification requesting permission for an administrator to access the client device data, the permission being obtained in response to a user interaction with the notification.

18. The non-transitory computer-readable medium of claim 15, wherein, when executed, the executable instructions further cause the at least one computing device to at least:

generate an audit log associated with the administrator review session, the audit log identifying activity by an administrator during access session and including how the computer technology issue was diagnosed and how the computer technology issue was resolved; and write the audit log to a distributed ledger.

19. The non-transitory computer-readable medium of claim 15, wherein, when executed, the executable instructions further cause the at least one computing device to at least terminate the administrator review session in an instance in which a user-defined time period for the administrator access has expired.

20. The non-transitory computer-readable medium of claim 15, wherein the type of computer technology issue is identified using a machine-learning model, and when executed, the executable instructions further cause the at least one computing device to at least train, based on the client device data of the determined type, the machine-learning model.

* * * * *